United States Patent [19]

Gallagher et al.

[11] Patent Number: 5,439,630
[45] Date of Patent: Aug. 8, 1995

[54] METHOD FOR MOLDING A TRIM PANEL WITH INTEGRALLY FORMED SIMULATED LEATHER APPLIQUES

[75] Inventors: Michael J. Gallagher, Hampton; Lawrence R. Nichols, Dover, both of N.H.

[73] Assignee: Davidson Textron Inc., Dover, N.H.

[21] Appl. No.: 114,928

[22] Filed: Sep. 2, 1993

[51] Int. Cl.⁶ .................. B29C 39/12; B32B 31/04
[52] U.S. Cl. ...................... 264/263; 156/293
[58] Field of Search .............. 264/46.4, 46.6, 46.8, 264/263, 511; 156/293

[56] References Cited

U.S. PATENT DOCUMENTS

| | | | |
|---|---|---|---|
| 4,247,586 | 1/1981 | Rochlin | 156/293 X |
| 4,952,351 | 8/1990 | Parker et al. | 264/46.4 |
| 4,973,438 | 11/1990 | Gaudreau | 264/45.7 |
| 5,006,288 | 4/1991 | Rhodes, Jr. et al. | 264/46.6 |
| 5,073,325 | 12/1991 | Gray | 264/245 |
| 5,091,031 | 2/1992 | Strapazzini | 264/46.8 X |
| 5,106,548 | 4/1992 | Matsuura et al. | 264/46.6 |
| 5,131,678 | 7/1992 | Gardner et al. | 280/732 |
| 5,244,612 | 9/1993 | Iwasawa et al. | 264/46.6 X |
| 5,324,462 | 6/1994 | Rohn | 264/46.6 X |

FOREIGN PATENT DOCUMENTS

| | | | |
|---|---|---|---|
| 53-66978 | 6/1978 | Japan | 264/46.8 |
| 59-5041 | 1/1984 | Japan | 264/46.4 |

*Primary Examiner*—Karen Aftergut
*Attorney, Agent, or Firm*—Reising, Ethington, Barnard & Perry

[57] ABSTRACT

An instrument trim panel (12) includes a shell (14) made from a flexible plastic material. A textured section (18) is circumscribed by a simulated seam (20). A closed cell plastic block (28) is press fitted behind the textured section. An air pocket (26) is interposed between the block and textured section. A rigid substrate (22) is molded and cured behind the shell (14) and block (28). The air pocket allows the textured section to be deformed to simulate the appearance and feel of a leather applique.

7 Claims, 2 Drawing Sheets

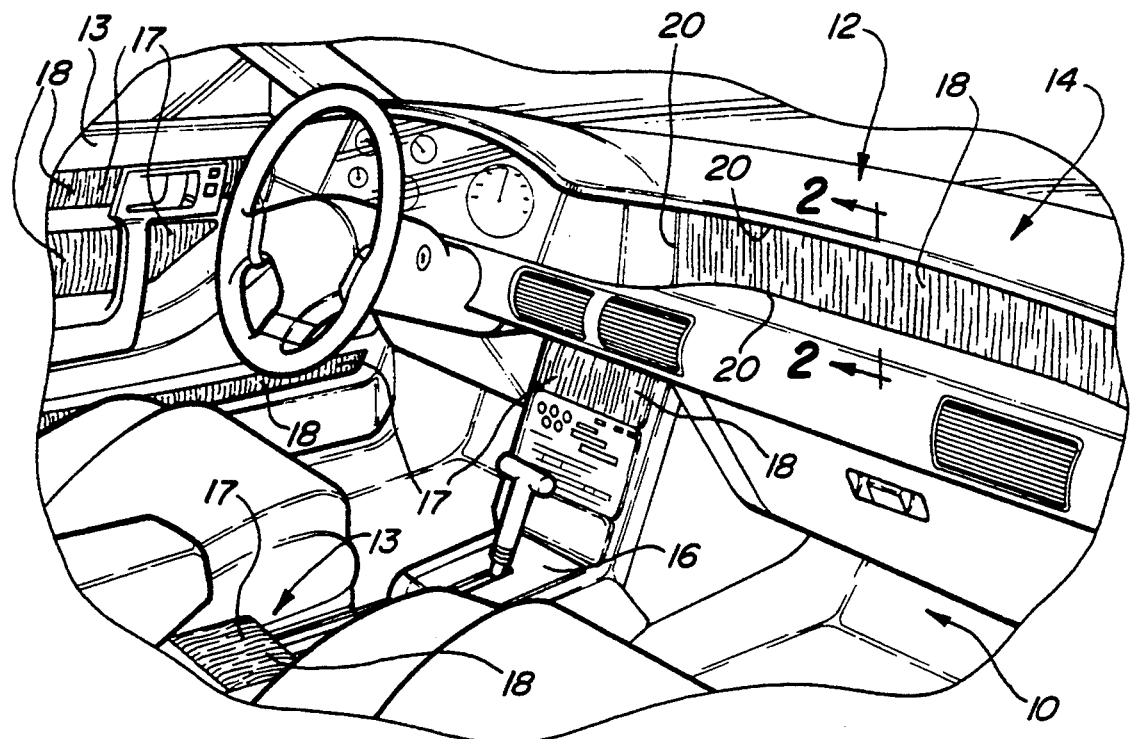

METHOD FOR MOLDING A TRIM PANEL WITH INTEGRALLY FORMED SIMULATED LEATHER APPLIQUES

TECHNICAL FIELD

The field of this invention relates to a motor vehicular interior trim panel having simulated leather appliques.

BACKGROUND OF THE DISCLOSURE

The use of thin walled plastic shells for products have included a cast shell of thermoplastic material with a decorative texture formed therein. The thin walled plastic shell is bonded to an underlying supportive substrate of rigidly cured plastic foam. Foam backed thin wall plastic shells have seen wide commercial utilization in interior trim panels for motor vehicles.

In order to promote the appearance of rich and luxurious interior, simulated leather appliques or folded leather have been adhered onto the trim panel. Often, the applique is formed by wrapping leather or simulated leather over a cushion foam section and substrate and bonding the leather to the backside of the substrate in such a way as to form wrinkles or folds in the leather that is on the front surface of the cushion foam. The applique is then adhered to the trim panel.

The cost and weight of these appliques are both high. The weight is greater due to the redundant substrate material for both the applique and the trim panel. Production of a separate applique that is subsequently attached to the trim panel is also expensive due to the additional tooling and steps required to form the applique and to subsequently adhere it to the trim panel.

What is needed is a trim panel with a simulated folded leather applique appearance. Furthermore, what is needed is a method of manufacturing a trim panel that incorporates a simulated leather applique having a textured surface.

SUMMARY OF THE DISCLOSURE

In accordance with one aspect of the invention, a method of integrally molding a trim panel for a motor vehicle and the like includes forming a simulated leather applique integral with the panel. The method includes the first step of forming a thin plastic outer shell having a backside surface and front outer surface. The thin plastic shell is positioned in a mold having a standing knife edge that circumscribes a textured section of the mold to form a textured section on the front surface of the shell. A closed cell non-porous cushion foam block is positioned at the backside surface of the shell opposite the textured section. The side walls of said cushion foam block are press fitted against upright walls of the shell that abut the standing knife edge.

A curable substrate is molded on a backside surface of the cushion foam and the backside surface of the plastic shell about the textured section such that upon curing, the substrate provides rigid support. A trim panel is thus formed with the substrate, cushion foam block, and plastic shell with a simulated applique located in front of said cushion foam block. After the mold with the knife edge is removed, a simulated seam is formed about the textured section.

Preferably, a compressible material is trapped between the cushion foam block and the textured section of the shell during the placement of said cushion foam block to allow deformation of the textured section upon an application of a small force after the substrate is cured. The material may be a low density open or closed cell foam or even merely a pocket of air.

In accordance with another aspect of the invention, a trim panel includes a shell of flexible plastic material that has a front exposed surface and a back surface. The front exposed surface has a textured section desirably simulating a plurality of wrinkles. A rigid cured substrate is adhered to a back surface of the shell about the textured section. A cushion member is interposed between the back side at the textured section of the shell and the rigid cured substrate.

The trim panel preferably has an upright wall with an upright double layered wall with a seam therebetween. The wall surrounds the cushion member such that a seam appears from the front exposed surface of the shell circumscribing the texture section. The trim panel preferably has its cushion member being press fitted against said texture section between opposing sections of said wall.

A compressible material such as a pocket of air is trapped between the cushion member and the texture section of the shell. The textured section preferably looks like folded or wrinkled leather that is applied onto the remainder of the trim panel. The textured section has the feel of genuine leather by being easily deformed against the air pocket when a small force is applied onto the textured section.

BRIEF DESCRIPTION OF THE DRAWINGS

Reference now is made to the accompanying drawings in which:

FIG. 1 is a perspective view of an interior of a motor vehicle illustrating an instrument panel and other trim panels in accordance with one embodiment of the invention;

FIG. 2 is a cross-sectional view taken along lines 2—2 shown in FIG. 1;

FIG. 3 is a fragmentary view illustrating a step in the method used to fabricate the construction shown in FIGS. 1 and 2;

DETAILED DESCRIPTION OF THE PREFERRED EMBODIMENT

Figure 4:
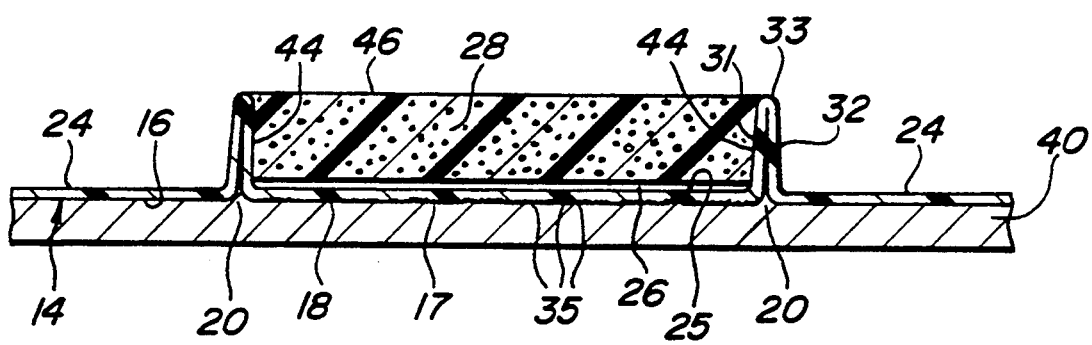
FIG. 4 is a view similar to FIG. 3 illustrating a subsequent step of pressing the cushion foam block in place.
Figure 5:
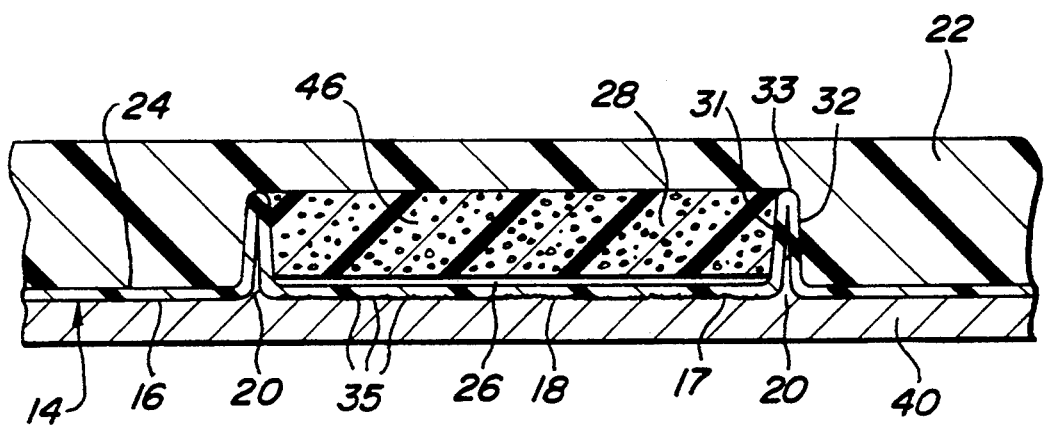
FIG. 5 is a view similar to FIG. 4 illustrating a subsequent step of providing a substrate of curable rigid urethane to form the illustrated embodiment.

Referring now to FIGS. 1 and 2, an interior 10 of a motor vehicle is shown with an interior trim component representatively shown as an instrument panel 12 and other trim panels 13. The panels 12 and 13 more particularly include an outer shell 14 that includes an outwardly facing exposed front surface 16. Further reference is made only to instrument panel 12 with the understanding that the same structure and method can be applied to trim panel 13. The front surface 16 includes at least one simulated leather applique section 18. A simulated seam 20 surrounds the simulated applique section 18.

The outer shell 14 is made from a relatively soft polyvinyl chloride resin material (PVC). As shown in more detail in FIG. 2, the outer shell 16 has its backside surface 24 bonded to a rigid foam material 22 except at its textured applique section 18.

A closed cell cushion block 28 is positioned behind the backside surface 25 at the applique section 18. The seam 20 is formed by a double layered upstanding wall section 30 having layers 31 and 32 folded at distal ridge 33. The cushion member abuts layer 31 while the rigid foam 22 abuts layer 32. An air pocket 26 is interposed between the closed cell cushion block 28 and textured applique section 18. The back surface 46 of the block 28 is aligned with the distal ridge 33 of wall section 30.

The textured applique section 18 has a plurality of folds or wrinkles 35 in the front surface 17 to simulate leather. The air pocket 26 behind the texture section 18 allows the textured section to be easily deformable against a small force to simulate the feel of a leather applique.

The texture section 18 has its outer surface 17 even with respect to the front surface 16 of the section about the textured section 18. It should be understood that the surface 17 may also be raised or recessed with respect to surface 16. Furthermore, the surfaces 16 and 17 need not be planar, but may be formed with a contour.

Formation of the instrument panel 10 starts with formation of the shell 14. The shell 14 may be formed in a shell mold typical to the cast process or produced in a pour mold typical to the spray urethane or vacuum forming process. As shown in FIG. 3, a pour mold 40 is shown having an upstanding knife edge 42 positioned about the periphery of the textured section 18. A sheet of pliable PVC is placed in the mold and is vacuum molded into the appropriate shaped shell 14 forming the textured sections 18 and front surfaces 16 and 17.

As shown in FIG. 4, the cushion member 28 is press fitted behind the textured section 18 with its side walls 44 pressed against opposing layers 31 of upstanding wall section 30. The press fit of cushion member 28 forms the air pocket 26 between the textured section 18 and the cushion member 28. The press fit of the block 28 within upstanding wall section 30 seals the pocket 26 against leakage.

The substrate backing 22 of urethane foam is then molded onto the back surface 24 of the shell 14, the wall layer 32 and the back surface 46 of cushion block 28. The pourable uncured urethane does not leak between the layer 31 and the cushion block 28 due to the press fit of block 28. The closed cell nature of the cushion block 28 also prevents the urethane foam from penetrating therethrough and into air pocket 26. Once cured the foam forms a rigid substrate 22 which provides structural rigidity to the entire instrument panel 12. The panels 12 are then demolded from mold 40.

Once the panel 12 is demolded, the air pocket 26 remains between the textured section 18 of the shell 14 and the cushion member 28. Consequently, the PVC shell material at the texture section 18 remains easily deformable when a small amount of force is applied to it resulting in a simulated feel of leather which is deformable and flexible.

Furthermore, the demolding of layers 31 and 32 from the knife edge sections 42 of the mold 40 form the seams 20 which simulate the appearance of a separate leather applique adhered onto the instrument panel.

It should be understood that the instrument panel is illustrative on one trim panel and that both the method and product formed by the method of the present invention are equally suitable for use with other types of trim panels. It should also be understood that the illustrated materials are representative of the materials which can be used and are not intended to limit the invention. The shell may also be made in a separate mold and later positioned in mold 40 for assembly with block 28 and substrate 22.

Other variations and modifications are possible without departing from the scope and spirit of the present invention as defined by the appended claims.

The embodiments in which an exclusive property or privilege is claimed are defined as follows:

1. A method of integrally molding a simulated leather applique with a plastic panel of an interior trim component for a motor vehicle, said method characterized by the steps of:
    forming a thin plastic outer shell having a back surface and front exposed surface, said shell having a textured section;
    said thin plastic shell being positioned in a mold having a standing knife edge about the textured section of said plastic shell;
    press fitting a cushion foam block at the back surface of said shell on the textured section with side walls of said cushion foam block press fitted against a shell section that abuts said standing knife edge;
    applying a moldable and curable substrate on a back surface of said cushion foam block and the back surface of said plastic shell about the textured section; and
    curing said substrate such that said substrate forms a rigid trim panel with said cushion foam block and shell having a simulated applique located in front of said cushion foam block at said textured section and a simulated seam where the knife edge of said mold was located about said textured section.

2. A method as defined in claim 1 further characterized by;
    said cushion foam block being non-porous or closed cell.

3. A method as defined in claim 1 further characterized by;
    a compressible material being interposed between said cushion foam block and said textured section during the press fitting of said cushion foam block to allow deformation of said textured section upon an application of a small force after said substrate is cured.

4. A method as defined in claim 3 further characterized by;
    said compressible material being a pocket of air;
    said pocket of air being sealed against leakage by said press fitting of said block against said shell section that abuts said knife edge.

5. A method of integrally molding a simulated applique with a plastic panel of an interior trim component for a motor vehicle, said method characterized by the steps of:
    forming a thin plastic outer shell having a back surface and front exposed surface, said shell having a simulated applique section having a texture distinctive from a surrounding area of said front exposed surface;
    positioning said thin plastic shell in a mold having a standing knife edge about the simulated applique section of said plastic shell;
    press fitting a non-porous member at the back surface of said shell on the simulated applique section with side walls of said non-porous member fitted against a shell section that abuts said standing knife edge;
    applying a moldable and curable substrate on a back surface of said non-porous member and the back surface of said plastic shell about the simulated applique section; and curing said substrate such that it forms a rigid trim panel with said non-porous member and said shell with a simulated applique located in front of said non-porous member and a simulated seam where the knife edge of said mold was located about said simulated applique section.

6. A method as define in claim 5 further characterized by;

a pocket of air being interposed between said non-porous member and said simulated applique section during the press fitting of said non-porous member to allow deformation of said simulated applique section upon an application of a small force after said substrate is cured.

7. A method of integrally molding a simulated deformable applique with a plastic panel of an interior trim component for a motor vehicle, said method characterized by the steps of:

forming a thin plastic outer shell having an back surface and front surface, said shell having a simulated applique section having a texture distinctive from a surrounding area of said front outer surface;

positioning said thin plastic shell in a mold having a standing knife edge about the simulated applique section of said plastic shell; fitting a member at the back surface of said shell behind the simulated applique section such that an air pocket is formed between said simulated applique section of said shell and said member within confines defined by a shell section that abuts said knife edge of said mold;

applying a moldable and curable substrate on said back surface of said shell and on a back surface of said member wherein said member prevents said substrate from filling said air pocket curing said substrate; and removing the mold such that a rigid trim panel is formed with said shell with a simulated applique located in front of said air pocket and a simulated seam where the knife edge of said mold was located about said simulated applique section.

* * * * *

UNITED STATES PATENT AND TRADEMARK OFFICE
CERTIFICATE OF CORRECTION

PATENT NO. : 5,439,630
DATED : August 8, 1995
INVENTOR(S) : Michael J. Gallagher et al.

It is certified that error appears in the above-indentified patent and that said Letters Patent is hereby corrected as shown below:

Column 5, line 21, delete "an" and insert therefor --a--.

Column 5, line 22, after "front" insert --outer--.

Column 6, line 18, after "simulated" insert --deformable--.

Signed and Sealed this

Eleventh Day of June, 1996

Attest:

BRUCE LEHMAN

Attesting Officer

Commissioner of Patents and Trademarks